3,150,107
PROCESS FOR PRODUCING A POLYOLEFIN
CATALYST CONTAINING $TiCl_2$, $TiCl_3$ AND
ELEMENTAL TITANIUM
Donald F. Hoeg, Rockville, Frank X. Werber, Kensington, and Walter R. Wszolek, Ellicott City, Md., assignors to W. R. Grace & Co., Clarksville, Md., a corporation of Connecticut
No Drawing. Filed Aug. 5, 1959, Ser. No. 831,708
5 Claims. (Cl. 252—441)

This invention is directed to polymerizing olefins such as ethylene and/or propylene in the substantial absence of contaminants or inhibitors such as moisture, oxygen, acetylene, acetone, hydrogen sulfide, and the like, under moderate pressures in the presence of a catalyst made by grinding titanium dichloride in an inert medium similarly free of contaminants.

The catalyst so prepared has been found to be much more active in olefin polymerization than titanium dichloride that has not been so prepared. The reason for the increased activity is not fully known. It appears, however, that the freshly fractured surfaces of the ground particles are extremely active if not allowed to come in contact with moisture, oxygen, or certain other "poisons," and that such surfaces may account for the increase in activity. It further appears that this increase cannot be accounted for by an increase in surface area.

The $TiCl_2$ catalyst so prepared is useful in making high-molecular weight polyolefins from monomers such as ethylene, propylene, and mixtures thereof. It is operable at temperatures ranging from room temperature up to 270° C. and higher, and at pressures from a few atmospheres, e.g., 100 p.s.i.g., to 5000 p.s.i.g., and even higher. For practical operation, however, temperatures in the range of 50–200° C. and pressures of 200 to 500 p.s.i. are suitable.

The polymerization reaction is operable with or without a solvent. If a solvent is used, it should be one which is liquid under the conditions of temperature and pressure used, and which contains no contaminants as aforesaid. Hydrocarbon solvents are preferred, e.g., pentane, hexane, heptane, cyclohexane, octane, benzene, xylene, toluene, and the like.

The amount of catalyst is not critical. Relatively small amounts are operable to form relatively large amounts of polymer. In general, a practical range is 0.001 to 1 g. of catalyst per gram of olefin polymerized. Even larger amounts are operable, but unnecessary.

The following examples illustrate the invention, but do not limit it.

EXAMPLE 1

Grinding $TiCl_2$ Catalyst

Into a 1-liter stainless steel jar containing about half its bulk volume of ½-inch stainless steel balls was placed 40 g. of commercial $TiCl_2$ (Sample "A–1").

The ball-milling was carried out under very pure, thoroughly dried lamp-grade nitrogen for 2½ days. The rolls were rotated at about 200–300 r.p.m. The ball-mill was then opened in a dry box maintained under a slight pressure of nitrogen of the same purity, and the product was there transferred to a storage vessel. This $TiCl_2$ is herein identified as "Sample A–2." Screen analyses of the product before and after milling are given in Table I below.

TABLE I

Screen Analyses of $TiCl_2$ Catalyst
Before and After Milling

| | Percent by weight | |
|---|---|---|
| | Before milling (Sample "A–1") | After milling (Sample "A–2") |
| Particle size: | | |
| >1 mm | 0.7 | 0.6 |
| 1 mm.–0.5 mm | 16.1 | 21.8 |
| ½–60 mesh | 18.8 | 38.9 |
| 60–140 mesh | 46.1 | 24.0 |
| 140–300 mesh | 12.8 | 10.6 |
| <300 mesh | 3.8 | 3.2 |

The increase in the amount of material in the 1 mm.–140 mesh range appears to be due to the agglomeration of smaller particles by electrostatic or Van der Waals forces.

The material before milling was black and had a granular crystalline appearance. After milling it was still black, but had a soft amorphous appearance. In general, after milling, it is extremely pyrophoric.

It is essential that the $TiCl_2$ be ground in the substantial absence of oxygen, moisture, and similar contaminants, e.g., CO, acetylene, $NH_3$, and ethers, ketones, and other oxygen-containing organic material. (Olefins and saturated hydrocarbons, however, are not contaminants.) We have found that "lamp-grade nitrogen," e.g., nitrogen of a purity suitable for filling light bulbs, is suitable. Also suitable are the pure noble gases, especially helium, neon, and argon. The same precautions against contaminants applicable in milling also apply to handling, storing, and using the milling material.

In a similar run, $TiCl_2$ was ball-milled under nitrogen for 24 hours, giving "Sample B."

In a still further run, $TiCl_2$ was ground by hand with mortar and pestle for 40 minutes in a dry box under argon to provide "Sample C."

The Samples A–2, B, and C, are effective catalysts for the polymerization of olefins, each being more active after milling than before.

The material can, in fact, be ground with comparable results in a high vacuum.

Any grinding (milling) at all under inert conditions will increase the activity of the $TiCl_2$ to some extent. However, the preferred procedure is to grind the material thoroughly for at least several hours, e.g., 5 to 300 hours, or even longer. Ball milling overnight is suitable and even longer periods are operable. Substantially any mechanism that causes the individual pieces of $TiCl_2$ to break up into smaller pieces and/or causes their surfaces to be cleaned or abraded can be used, e.g., mortar and pestle, ball mill, rod mill, pebble mill, jet (or colloid) mill, and the like.

Throughout this specification it will be understood that all samples of activated $TiCl_2$ are weighed and added to the autoclave under inert conditions equivalent to the conditions of activation as regards freedom from contaminants.

EXAMPLE 2

Synthesis of Polyethylene With Ground $TiCl_2$

Using the aforesaid precautions, 0.58 g. "Sample A–2" was placed in a 1-liter stainless steel autoclave equipped with stirrer, thermowell, rupture disc, a ball valve serving as catalyst inlet, and an inlet for charging solvent and gases. Next, 300 cc. of pure, dry cyclohexane, solvent was added. The stirrer was then turned on, and the autoclave was heated to about 140° C. Then the autoclave was connected to the ethylene tank, pressured to 450 p.s.i.g., and maintained under this ethylene pressure throughout the run. The ethylene used was likewise very dry and quite pure.

The run proceeds (typically) at a temperature ranging between about 140° and about 160° C. Considerable variation in temperature is, however, possible in using activated $TiCl_2$. After ½ hour the run was stopped and the autoclave was cooled (to below the boiling point of the solvent), and was then vented and opened. The polyethylene-containing reaction slurry in cyclohexane was then transferred to a liter beaker. At this stage the product was black, owing to the $TiCl_2$ content. The yield of crude polymer was 18 g.

If desired, the crude material may be purified and recovered by techniques well known in the art. For example, the material may be refluxed with alcoholic acids, e.g., HCl-methanol, followed by filtration and drying.

The product purified as above was found to be of extremely high density, i.e., with an average molecular weight in excess of 100,000.

Using the well known formula for determining catalyst activity (grams of polymer/grams of catalyst/per hour) it will be seen that this particular catalyst has an activity of $$\frac{18}{0.58 \times 0.5} = 59.6$$

In a comparable run, using $TiCl_2$ that had not been ball-milled, and having substantially the screen analysis of Sample A–1, 1.18 g. of catalyst was used for 1 hour with a yield of 3 g. of polyethylene. The catalyst activity was therefore $$\frac{3}{1.18 \times 1} = 2.5$$

Since the yield was smaller and the amount of catalyst and the reaction time greater, it is clear that ball-milling gives a much more active catalyst. In another control run (at a lower temperature) 1.86 g. of finely divided $TiCl_2$ of commerce, not ground under inert conditions, was used as the catalyst to polymerize ethylene in cyclohexane at 120–130° C. under 450 p.s.i.g. for 3¼ hours. The yield of polyethylene was 5 g. The catalyst activity was therefore $$\frac{5}{1.86 \times 3.25} \text{ or } 0.83$$

Further runs carried out using the activated $TiCl_2$ of this invention and substantially the same techniques of Example 2 above are summarized in Table II, below.

EXAMPLE 12

As above pointed out, exposure to oxygen, etc., poisons the catalyst. This effect is further demonstrated in this example. The catalyst poisoned in this way, however, may be reactivated by further grinding, as below noted.

A glass mill of 250 ml. capacity containing 49.5 g. $TiCl_2$ and 230 g. of flint pebbles under argon was placed on a ball mill. Before milling the sample had substantially the same mesh analysis of the material of Sample "A–1" in Table I above. The sample was then pebble-milled, and beginning with the third day specimens were withdrawn at various intervals under dry argon and their respective activities tested by substantially the same procedure of Example 2. The results are shown in Table III, following:

TABLE III

*Effect of Re-Milling "Poisoned" Catalyst*

| Sample withdrawn after day, number: | Activity |
|---|---|
| 0 (control: tested before milling) | 0.1 |
| 3 | 2.0 |
| 4 | 2.75 |
| 7 (milled over week-end) | 4.7 |
| 8 | 9.3 |
| 11 | 15.0 |
| 15 (ambient air admitted to mill for few seconds) | ca. 0.5 |
| 24 | 3.3 |
| 28 | 15.4 |

When using great care to exclude moisture, air, etc., and especially after the "dry box" has become "drier" by reason of internal exposure to very pure nitrogen, argon, or the like for two or three months, an especially marked improvement in catalyst activity will generally be noted, e.g., as shown in the following table.

In the following table the polymerization procedure and apparatus were substantially the same as for Example 2. The solvent in each run was toluene (1.66 lb.). The catalyst was $TiCl_2$ ball-milled under argon, for 119 hours. All material handling was done in a dry box under argon.

TABLE IV

| Example No. | Catalyst, g. | Temp., °C. | Press., p.s.i. | Time, mins. | Polyethylene | |
|---|---|---|---|---|---|---|
| | | | | | g. | Density |
| 12 | 1.46 | 150–195 | 470 | 17 | 50.5 | 0.9490 |
| 13 | 1.22 | 180–224 | 490 | 30 | 89.5 | 0.9472 |
| 14 | 1.5 | 190–220 | 480–500 | 40 | 94.5 | 0.9452 |
| 15 | 1.06 | 248–262 | 480–490 | 23 | 26.7 | 0.9576 |
| 16 | 1.15 | 151–184 | 480 | 20 | 51.8 | 0.9514 |

TABLE II

*Polymerization of Ethylene and Propylene Using Ground $TiCl_2$ Catalyst*

| Exam. No. | Monomer | Catalyst, g. | Solvent | Temp., °C. | Total press., p.s.i.g. | Reaction time, hours | Yield polymer, g. |
|---|---|---|---|---|---|---|---|
| 3 | Ethylene | [1] 0.54 | None | 27–33 (not heated). | 450 | 18 | 8 |
| 4 | do | [1] 1.5 | do | 80 | 450–480 | 18 | 31 |
| 5 | do | [1] 1.5 | 300 ml. cyclohexane. | 180–194 | 440–490 | 2 | 13.5 |
| 6 | do | [2] 1.02 | 500 ml. cyclohexane. | 130–148 | 390–465 | 2.75 | 40 |
| 7 | do | [3] 0.68 | do | 139–171 | 410–485 | 2 | 29 |
| 8 | do | [4] 0.54 | do | 134–178 | 410–485 | 2 | 24 |
| 9 | Propylene | [1] 1.49 | 300 ml. cyclohexane. | Ca. 87 | 200–360 | 5 | 20 |
| 10 | do | [1] 0.98 | do | Room temp. | 130 | 60 | 1–2 |
| 11 | do | [1] 1.27 | do | 70–114 | 130–185 | 3.25 | 5 |

[1] Ball-milled under nitrogen for 15 hours.
[2] Ball-milled under nitrogen for 25 hours.
[3] Ball-milled under nitrogen for 60 hours.
[4] Ball-milled under argon for 60 hours.

EXAMPLE 17

As already mentioned, the milled TiCl$_2$ catalyst is also effective with ethylene-propylene mixtures. E.g., using the general procedure of Example 2, 1.32 g. of TiCl$_2$ (ball-milled 5 days under argon), 300 ml. purified cyclohexane, and 22 ml. liquid propylene was placed in the autoclave, which was then sealed and heated to 145° C. When it reached this temperature it was pressured with ethylene to 450 p.s.i. The polymerization was run at 140° C. for 32 minutes, after which the autoclave was vented, cooled, and the polymer recovered. The purified polymer had a density of about 0.93 and a propylene content of about 6% (by infra-red measurement). On pressing it gave a rubbery film.

There are certain curious changes in the TiCl$_2$ mass on ball milling.

Firstly, the surface area (square meters per gram) increases, rapidly at first, then more slowly, reaching a peak at about 5 days, more or less, depending somewhat on apparatus load, milling rate, etc. Ordinarily, this "area" peak does not correspond with catalyst activity peak, which generally occurs well before the area peak. After the area peak is reached, further milling causes a gradual decline in area. With this area decline, activity also declines, and may drop surprisingly toward the 8th to 12th day of milling. (Such catalyst, however, is nevertheless much more active than one that has not been ground at all.)

Secondly, the TiCl$_2$ slowly disproportionates to TiCl$_3$ and Ti, according to the following equation:

$$3\ TiCl_2 \rightarrow 2\ TiCl_3 + Ti$$

Referring to Table V it will be evident that the decrease in TiCl$_2$ and the increase in TiCl$_3$ and Ti can be accounted for by the mechanism of the foregoing equation.

(Incidentally, it may be here noted that the TiCl$_2$ of commerce, being generally made from TiCl$_3$ and Ti, may be expected to contain small amounts of these two materials.)

The reasons why grinding TiCl$_2$ increases its activity as a polyethylene catalyst are not clearly understood. As shown in Table V, the surface area of the catalyst is increased by grinding, as may be expected. However, it is equally clear that activity is not a simple function of surface area. For example, the surface area of the catalyst of Example 21 is 27 sq. meters per gram, with an activity of 93.7, whereas the surface area of the catalyst of Example 19 is only 10.7, but with an activity of 121.2. Also, in comparing the catalysts of Examples 18 and 19, it is noted that increasing the surface area by a factor of 3–5 increases the activity by a factor of about 70. In considering the TiCl$_2$ content of the ground catalysts, it will be observed that activity is roughly correlated to the percentage of TiCl$_2$ in the catalyst. On the other hand, the percent of TiCl$_2$ in a ground catalyst is always less than that in an unground catalyst owing to the disproportionation reaction above discussed, and yet the unground catalyst is much less active than the ground catalyst. Accordingly, activity cannot be said to be a firm function of TiCl$_2$ content.

TABLE V

*Physical and Chemical Changes Occurring While Ball Milling TiCl$_2$*

| Exam. No. | Days milled (under argon) | Percent TiCl$_2$ | Percent TiCl$_3$ | Percent Ti | Catalyst activity | Surface area, m.$^2$/gm. |
|---|---|---|---|---|---|---|
| 18 | 0 | 87.5 | 6.8 | 1.4 | 1.70 | 2–3 |
| 19 | 1 | 76.7 | 16.7 | 2.4 | 121.2 | 10.7 |
| 20 | 4 | 46.5 | 41.5 | 6.3 | 94.0 | 16.2 |
| 21 | 5 | 45 | 44.4 | 7.7 | 93.7 | 27.0 |
| 22 | 6 | 39 | 50.3 | 7.8 | 72.2 | 19.8 |
| 23 | 9 | 25.3 | 61.2 | 10.1 | 16 | 15.5 |

The two following examples provide more complete working data for the catalysts of Examples 18 and 19.

EXAMPLE 18

Following the procedure of Example 2, 0.71 gram of unground TiCl$_2$ catalyst was placed in the autoclave with 0.66 pound of toluene. The polymerization temperature was 148–166° C., the pressure was 475–540 p.s.i., the reaction time was 1 hour and 3 minutes, and the yield of solid polyethylene was 1.3 grams.

EXAMPLE 19

Following the procedure of the preceding example, 1.08 grams of the catalyst was used, the polymerization temperature being 154–168° C., the pressure 420–450 p.s.i., the reaction time 30 minutes, and the yield, 65.5 grams. The solvent was 0.66 pound toluene.

The uses of the polyolefins of this invention are analogous to those prepared by prior art procedures. The solid polymers can be used to make moldings, film, filament, pipe, tubing, and the like, using substantially the same equipment and technique customary for the solid polyolefins of the prior art.

This application is a continuation in part of our copending S.N. 687,614, filed October 2, 1957, now abandoned.

We claim:

1. The method of activating TiCl$_2$ that comprises grinding a feed consisting essentially of TiCl$_2$ under inert conditions for 1–6 days to give a resultant ground TiCl$_2$ containing about 39–77% TiCl$_2$, 17–50% TiCl$_3$, and 2–8% Ti, and having a surface area of about 11–27 square meters per gram.

2. The method according to claim 1 in which the TiCl$_2$ is ground in an atmosphere of an inert vapor.

3. The method according to claim 2 in which the vapor is nitrogen.

4. The method according to claim 2 in which the atmosphere is a noble gas.

5. The method according to claim 4 in which the gas is argon.

References Cited in the file of this patent

UNITED STATES PATENTS

| 2,893,984 | Seelbach et al. | July 7, 1959 |
| 2,956,050 | Benning | Oct. 11, 1960 |

FOREIGN PATENTS

| 533,362 | Belgium | May 16, 1955 |
| 1,132,506 | France | Nov. 5, 1956 |
| 1,134,740 | France | Dec. 3, 1956 |
| 777,538 | Great Britain | June 26, 1957 |